US007296776B2

(12) United States Patent
Pasto

(10) Patent No.: US 7,296,776 B2
(45) Date of Patent: Nov. 20, 2007

(54) METHOD AND APPARATUS FOR BUTTRESS STABILIZATION

(75) Inventor: Cris E. Pasto, Spencer, NY (US)

(73) Assignee: Res-Q-Jack, Inc., Elmira, NY (US)

( * ) Notice: Subject to any disclaimer, the term of this patent is extended or adjusted under 35 U.S.C. 154(b) by 0 days.

(21) Appl. No.: 11/380,948

(22) Filed: May 1, 2006

(65) Prior Publication Data

US 2007/0018068 A1 Jan. 25, 2007

Related U.S. Application Data

(63) Continuation of application No. 10/720,997, filed on Nov. 24, 2003.

(51) Int. Cl.
*A47F 5/00* (2006.01)
*E04G 25/00* (2006.01)
*F16M 13/00* (2006.01)

(52) U.S. Cl. .................... 248/352; 248/163.1; 248/127; 248/354.1; 248/354.5; 254/45; 280/763.1; 280/764.1; 280/765.1; 280/766.1; 280/762

(58) Field of Classification Search ................ 248/352, 248/363.1, 127, 354.5; 254/45; 280/763.1, 280/764.1, 765.1, 766.1, 762
See application file for complete search history.

(56) References Cited

U.S. PATENT DOCUMENTS

| | | | | |
|---|---|---|---|---|
| 1,894,293 | A * | 1/1933 | Green | 248/352 |
| 2,630,296 | A * | 3/1953 | Lucker | 254/99 |
| 3,178,146 | A * | 4/1965 | Goodale | 248/352 |
| 3,430,911 | A * | 3/1969 | Olson | 254/100 |
| 4,146,250 | A * | 3/1979 | DenHerder | 280/765.1 |
| 4,198,847 | A * | 4/1980 | Russell et al. | 72/462 |
| D281,113 | S * | 10/1985 | Plumb | D34/31 |
| 4,941,343 | A * | 7/1990 | Stancato | 72/447 |
| 5,180,131 | A * | 1/1993 | Few | 248/352 |
| 5,520,030 | A * | 5/1996 | Muldoon | 70/14 |
| 5,575,492 | A * | 11/1996 | Stone | 280/475 |
| 5,613,658 | A * | 3/1997 | Rogelja | 248/163.1 |
| 5,943,830 | A * | 8/1999 | Truitt | 52/127.2 |
| 6,095,474 | A * | 8/2000 | Arnold | 248/352 |
| 6,142,488 | A * | 11/2000 | Orr | 280/6.153 |
| 6,158,705 | A * | 12/2000 | Cudmore et al. | 248/354.1 |
| 6,234,440 | B1 * | 5/2001 | Boney et al. | 248/354.1 |
| 6,612,533 | B2 * | 9/2003 | Biles et al. | 248/354.1 |
| 6,776,383 | B2 * | 8/2004 | Lanka | 248/352 |

* cited by examiner

*Primary Examiner*—Carl D. Friedman
*Assistant Examiner*—Michael McDuffie
(74) *Attorney, Agent, or Firm*—Thomas T. Aquilla

(57) ABSTRACT

A method for stabilizing a roof-resting vehicle includes the steps of leaning one or more buttress stands against a rear fender area of the vehicle, passing a chain under a rear end of the vehicle from one of the buttress stands to another, tightening the slack from the chain by pulling chain-grab end fittings towards the fenders at the vehicle undercarriage, using a ratchet strap, restraining the chain from sliding off the rear end of the vehicle by attaching a ratchet strap to the chain near a trunk lid of the vehicle, and passing the chain up to the vehicle undercarriage in front of a wheel assembly of the vehicle, attaching a ratchet strap at a base of the one or more buttress stands and tightening, and placing wedges in front of the opposite end of the vehicle, such that the vehicle is stabilized.

5 Claims, 20 Drawing Sheets

METHOD AND APPARATUS FOR BUTTRESS STABILIZATION

REFERENCE TO RELATED APPLICATIONS

This is a continuation-in-part patent application of copending application Ser. No. 09/982,368, filed Oct. 18, 2001, entitled "METHOD AND APPARATUS FOR BUTTRESS STABILIZATION". The aforementioned application is hereby incorporated herein by reference in its entirety.

BACKGROUND OF THE INVENTION

1. Field of the Invention

The invention pertains to the field of emergency rescue techniques. More particularly, the invention pertains to a method and apparatus for stabilizing a roof-resting motor vehicle, such as for access by rescue workers.

2. Description of Related Art

A roof-resting motor vehicle can be a difficult situation for rescue teams in terms of stabilization. In any stabilization effort, quick and simple solutions are desired. Time spent on vehicle stabilization is time not spent on victim extrication and patient care. What is often overlooked is that most of the known quick and simple techniques for stabilizing a roof-resting vehicle interfere with the passenger compartment. Many of these techniques involve attaching restraint straps to the rear posts, or running straps across the door up to the undercarriage of the vehicle, thus limiting extrication options.

Another problem with the stabilization of a roof-resting vehicle is that the locations most desired to place stabilization stands are the least conducive to a good purchase. In many situations, the engine weight of the vehicle keeps the nose down and the rear end up, leaving a sloped slippery surface with little for a prop tip to engage. The rear of a typical sedan, for example, provides very few solid locations for stand engagement. Examples of areas which typically lend themselves to purchase include fender light knockouts in fenders, gas fill openings, rear trunk walls, tail light knockouts, and some bumpers or bumper supports. Often one can punch out the rear fender lights, thus leaving a hole in the fender as a purchase point.

Depending on vehicle condition as a result of the collision, the presence of rust, and/or vehicle material composition, one may be able to gain a purchase sufficient to remove "play" in the vehicle. However, if vertical support is necessary, this could be a problem with sheet metal or plastic materials, particularly if the fenders are the only purchase. If one opens the gas fill door, one may find a good purchase there. Unfortunately, a gas fill door typically is available only on one side, of the vehicle (although some models of vehicles have them on two sides, but this is a rare exception). If fuel is leaking, this will have to be addressed also. Setting the metal stand against a metal fender could possibly cause ignition.

The rear trunk wall usually provides a good grip for a channel type end fitting. However, getting to it can often be difficult, unless the trunk lid is removed. Bumpers are another option, and come in many shapes and materials. Some are strong, some are weak. Bumper supports vary considerably as well. One technique which is very quick to employ, is a single stand centered in the rear of the vehicle, in conjunction with step blocking or wedges in front of the 'A' posts. This basically provides three points of stabilization. However, two of the points, the wedges, are low relative to the center of gravity of the vehicle, and do little to increase the vehicle "footprint".

Note that a roof-resting vehicle has a much lower center of gravity in comparison with a side-resting vehicle, as well as a wider footprint to start with. The wedges do, however increase good solid ground contact. An advantage to this type of setup is that the prop purchase is typically a solid one with the rear trunk wall or a solid bumper, and the base is well restrained. However, there are several disadvantages with this type of setup. To restrain the base properly, the straps typically are either hooked at the rear posts, or run up the sides to the vehicle undercarriage. Attaching to the rear posts can in some situations cause difficulty in roof removal. Further, straps that run up the sides in front of the doors limit access from the sides. In addition, the stand itself is centered in the rear of the vehicle, thus hampering access to the rear window.

Another known method is to apply a stand at each fender, again with wedges in front of the 'A' post. With a good purchase, this can be sufficient stabilization in some cases. With this setup, the base strap of one stand is connected to the opposite stand base. Disadvantages with this setup include the purchase difficulties mentioned earlier, along with the fact that the bases are not restrained as completely as possible. If the vehicle can be restrained from sliding, the lack of sideward base restraint most likely will not be an issue. An advantage to this setup is that the passenger compartment is left relatively unobstructed.

Another known technique is to combine the previous two methods, thus providing a stand at both rear fenders and a stand at the rear center, along with the wedge cribbing at the 'A' post. Restraint straps can be configured in a few different ways. One strapping configuration is to strap the fender stand bases to each other independent of the rear stand, and to strap the rear stand base to the rear roof posts using 'J' hooks. Another method is to strap the rear stand to the fender stands, and then strap the fender stands to the rear post. In addition, the fender stands may be strapped to each other. In this situation, the straps connected to the rear posts can be moved to the front of the vehicle, thus leaving the passenger compartment unobstructed. The final strap configuration noted above keeps extrication options open, however, the difficulty of finding quick and solid stand engagement remains a problem.

Michalo, U.S. Pat. No. 6,017,170, "Adjustable Self Locking Shoring Strut", and Cudmore, et al, U.S. Pat. No. 6,158,705, "Vehicle Stabilization and Support Tool" are examples of prior art shoring struts, which could be used with the method of the invention, if equipped with appropriately designed end fittings, which are not shown in the patents. Neither patent discloses a method of use similar to the method of the invention. Cudmore, et. al, suggests tying the base of a support tool to the vehicle, but uses only one strut and does not discuss where the strap should be attached.

SUMMARY OF THE INVENTION

The present invention provides new techniques for stabilizing a roof-resting motor vehicle, which are quick, simple, require no search for prop purchase, and leave the passenger compartment free from obstruction, thereby keeping multiple access options open.

An improved method for stabilizing a roof-resting vehicle includes the steps of leaning one or more buttress stands, each preferably having chain-grab end fittings or other suitable attaching means, against a fender area of the vehicle, passing a chain or other suitable fastening means under an end of the vehicle from one of the buttress stands to another (if more than one stand is used), with slack extending up to the vehicle's undercarriage on each side of the vehicle, tightening the slack from the chain or other suitable fastening means by pulling the chain-grab end fittings or other suitable attaching means towards the fenders at the vehicle undercarriage or lower side of the vehicle, using a ratchet strap or similar tightening means, optionally restraining the chain or other suitable fastening means from sliding off the end of the vehicle by attaching a ratchet strap or similar tightening means to the chain or other suitable fastening means near the vehicle, and passing the chain or other suitable fastening means up to the vehicle undercarriage in front of a wheel assembly of the vehicle, attaching a ratchet strap or similar tightening means at a base of the one or more buttress stands and tightening, and optionally placing wedges in front of each roof support post, such that the vehicle is stabilized.

DETAILED DESCRIPTION OF THE INVENTION

The vehicle stabilization method of the present invention was developed with the following goals in mind: a) provide universal stand engagement at fenders independent of vehicle construction, material, and design; b) keep patient access free from obstruction; c) keep all possible extrication options available; d) provide solid stabilization; e) simple to understand; and f) quick setup.

Figure 1:
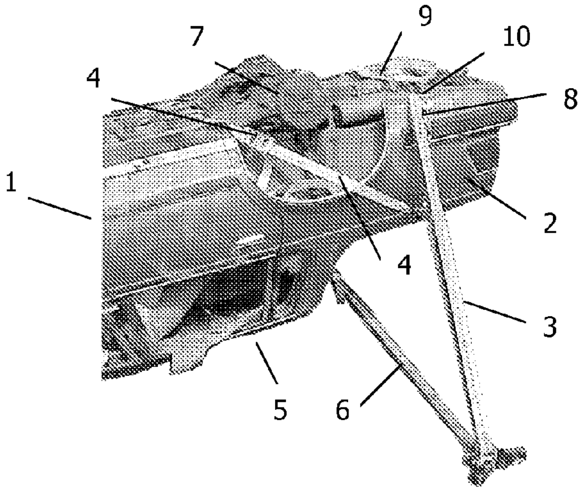
FIG. 1 shows a side view of a vehicle stabilized by the invention.
Figure 2:
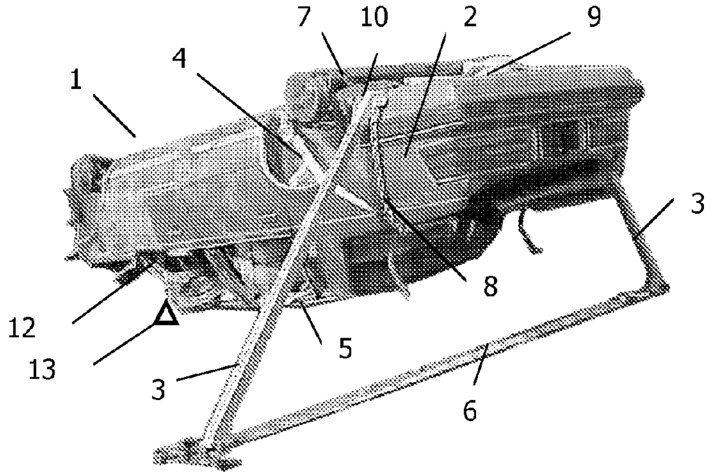
FIG. 2 shows a rear quarter view of a vehicle stabilized by the invention.
Figure 3:
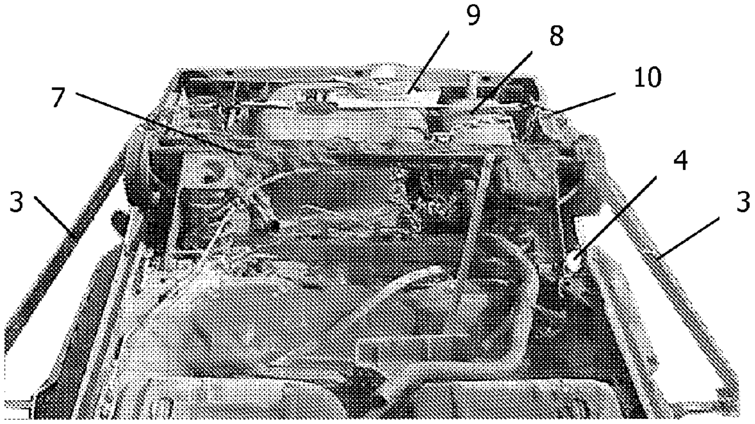
FIG. 3 shows a view of the undercarriage of a vehicle stabilized by the invention.
Figure 4:
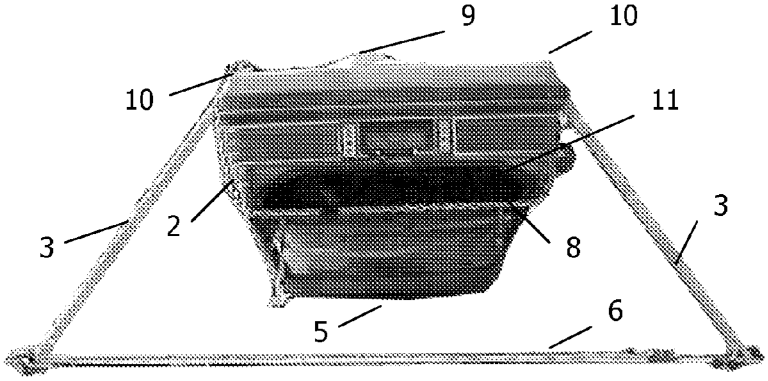
FIG. 4 shows a rear view of a vehicle stabilized by the invention.
Figure 5:
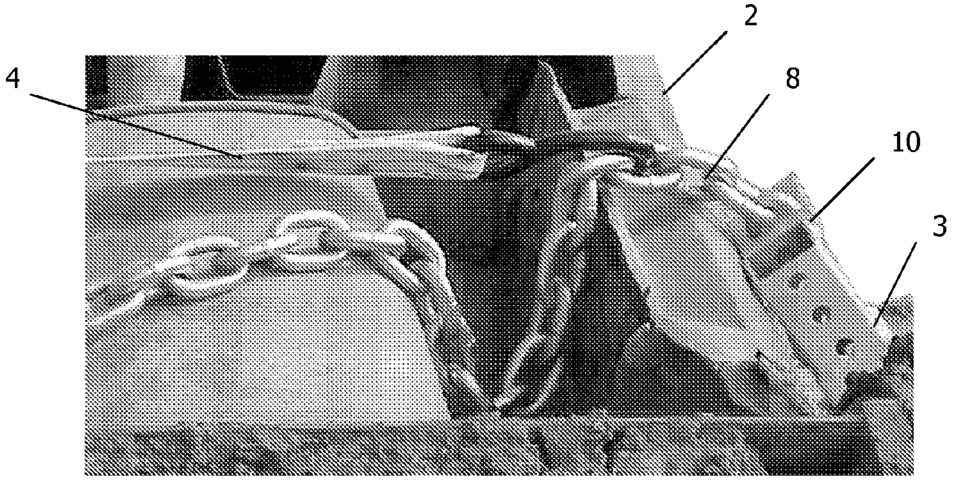
FIG. 5 shows a detail view of the undercarriage of a vehicle stabilized by the invention.
Figure 6:
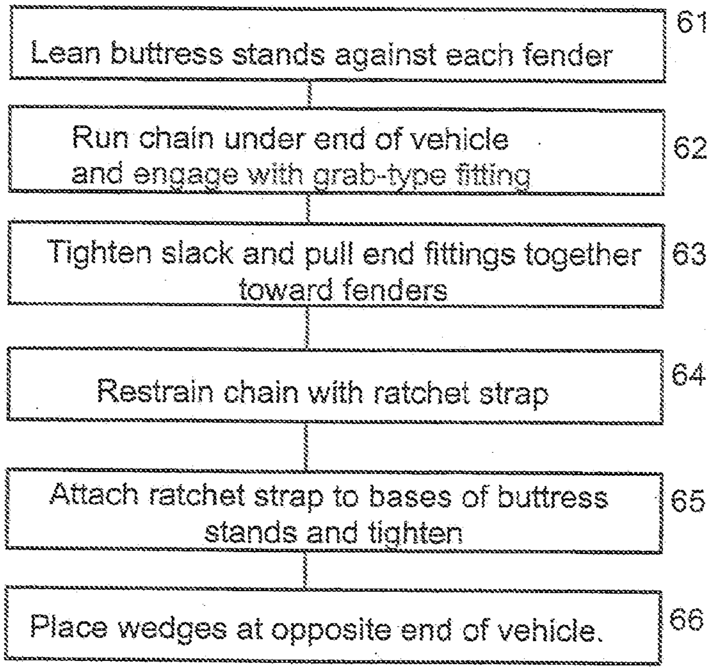
FIG. 6 shows a flowchart of the method of the invention.

As detailed in the flowchart of FIG. 6, and as shown in FIGS. 1 through 5 and 10 through 12, an embodiment of the technique of the present invention involves generally the following steps:

(61) lean buttress stands (3) preferably with special chain grab end fittings (10) preferably against each fender (2) on an end of the vehicle (1), with the bases spaced outward from the vehicle to form a stable angle.

Figure 10:
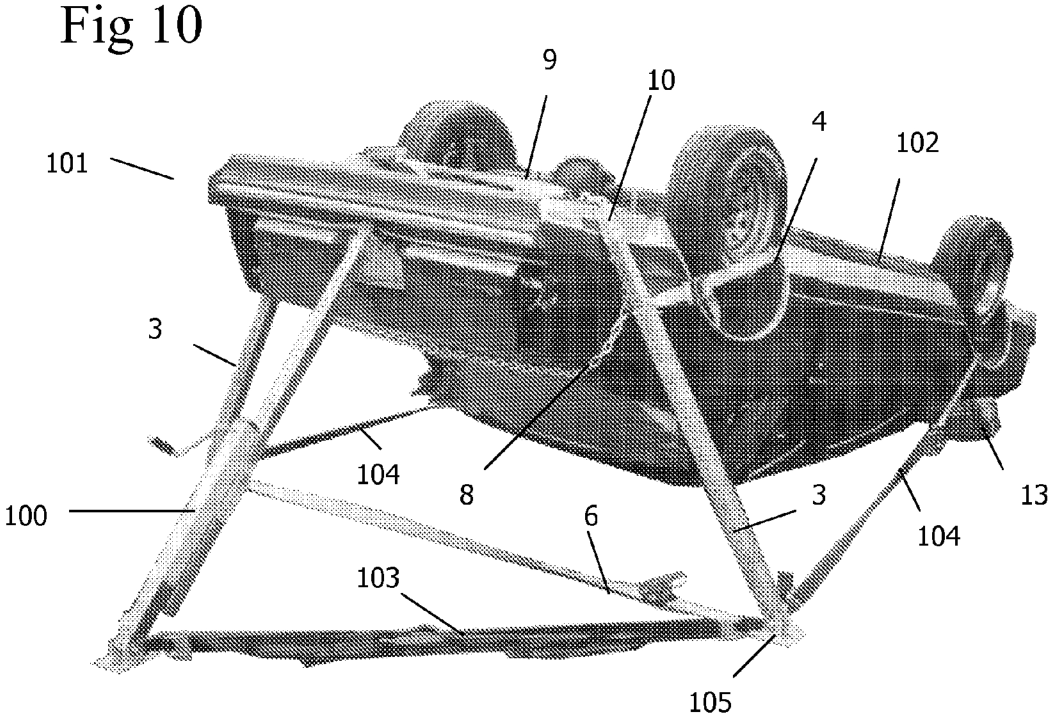
FIG. 10 shows a vehicle stabilized by the invention, in an embodiment using three buttresses.

Stand, buttress, strut, adjustable stand, cribbing post, post, and jack stand may be used interchangeably to describe the rigid member extending from the vehicle down and outward to the ground. The stands optionally are adjustable on fixed increments, such as jack stands, or include a lifting means, or consist simply of timber posts, for example. This member may be of a fixed length, although the length is preferably adjustable. The buttresses (3) in FIGS. 1-4 and 11, and jack-type buttresses (120) in FIG. 12 or (100) in FIG. 10 are all adjustable, either by pinned telescopic sections or the same combined with ajack. The member length may be adjusted by various means: manually, mechanically, pneumatically, electrically, or otherwise—as, for example, by jack handle (121) shown in FIG. 12. Depending on the adjustment method of the particular buttress, the length may or may not be adjusted under a loaded condition—a jack, for instance, can be adjusted in length while under load, while a buttress with pinned holes would not. While the stands shown are all adjustable length, stands may be of fixed length as well constructed of timber, metal, etc.

Figure 11:
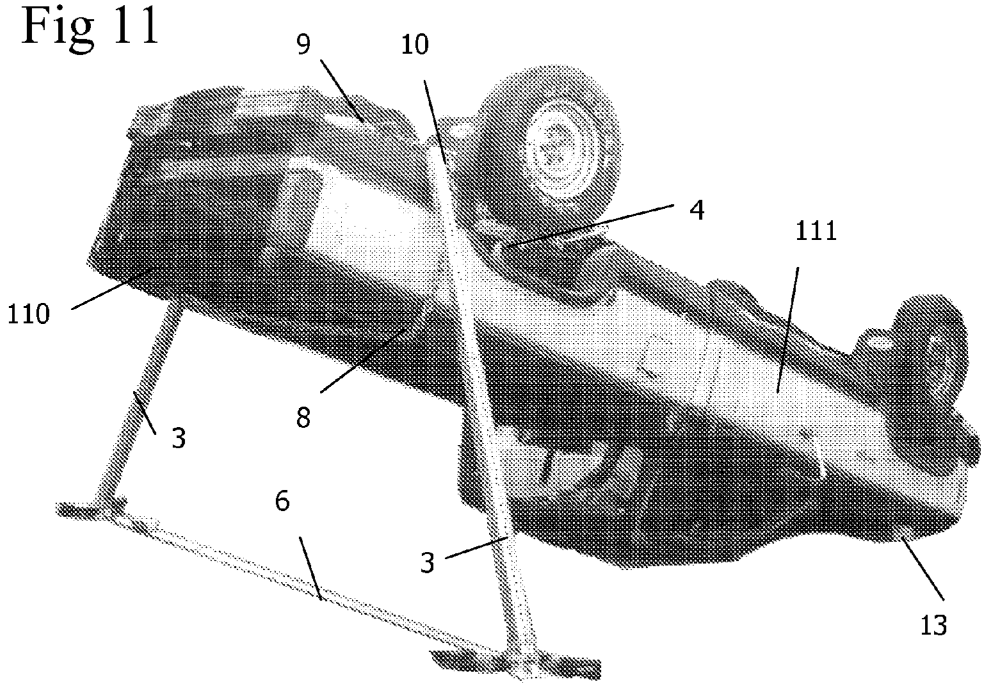
FIG. 11 shows how the method of the invention is used with a pickup-truck type vehicle.
Figure 12:
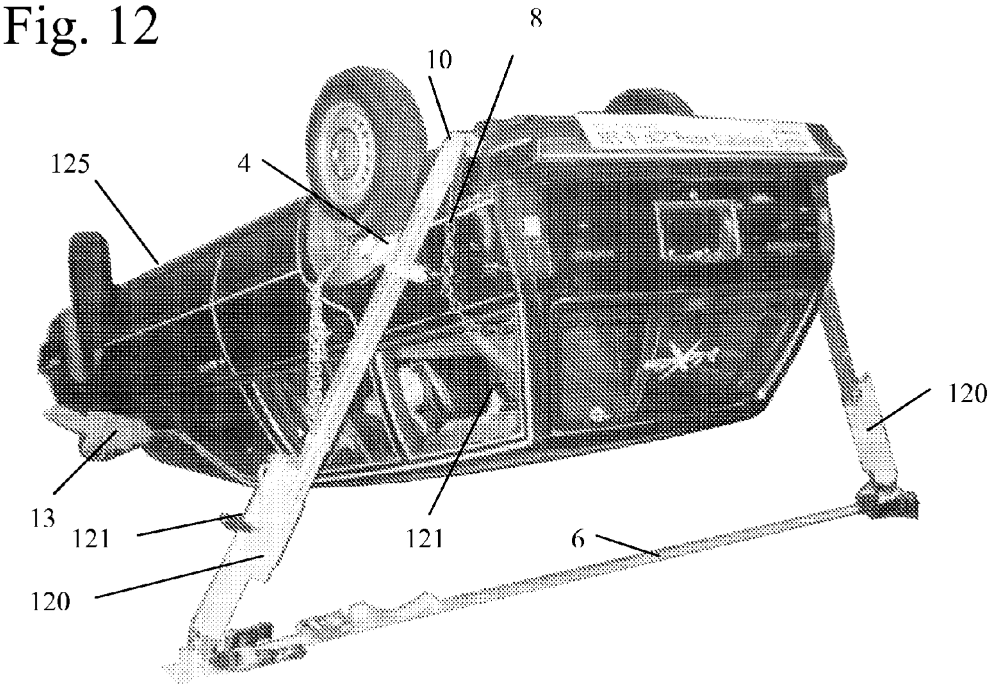
FIG. 12 shows a hatchback-type vehicle stabilized by the method of the invention, using jack-type buttress stands.

Note that while this method might normally be used at the rear end of the vehicle, as shown in the figures, because of the tendency of the weight of the engine to pull the front of the vehicle down, it will be understood that the method of the invention is equally applicable to situations where the front end of the vehicle needs to be stabilized and the trunk is down, with other types of vehicles such as the pickup truck shown in FIG. 11 or the hatchback of FIG. 12, or convertibles or tractors which do not have roofs, or where the vehicle is in other positions than resting on its roof, as perhaps on its side.

Figure 8A:
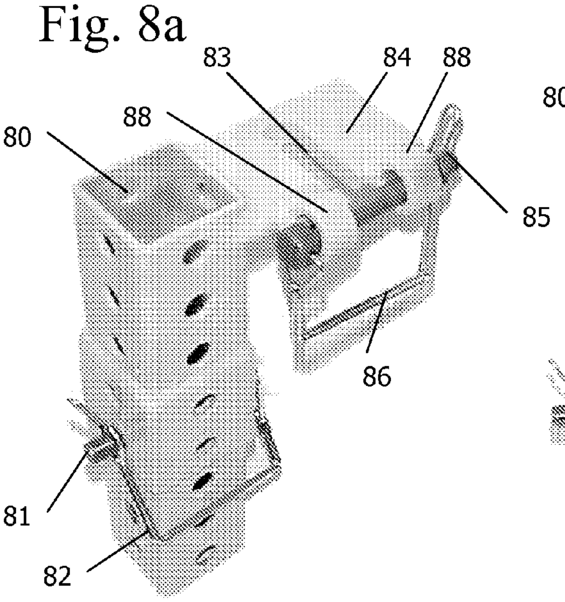
FIG. 8*a* shows an embodiment of the chain-grab end fitting of the invention.
Figure 8B:
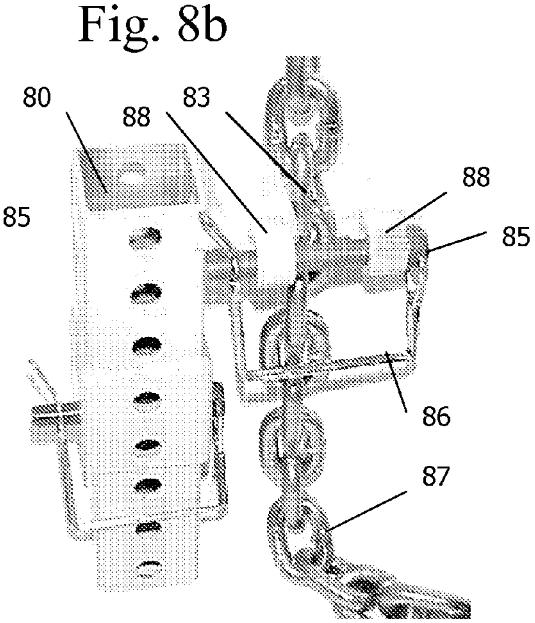
FIG. 8*b* shows the embodiment of the chain-grab end fitting of the invention of FIG. 8*a*, with a chain engaged.
Figure 8C:
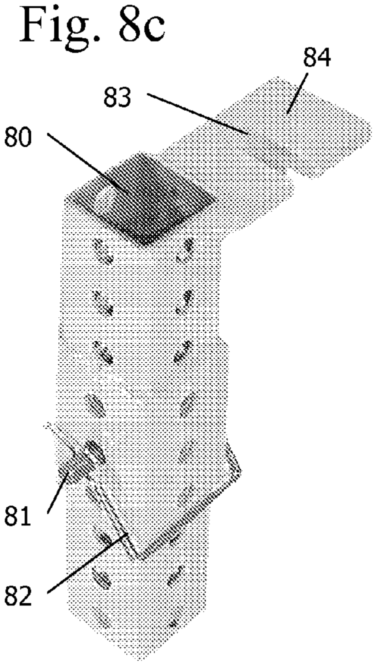
FIG. 8*c* shows another embodiment of the chain-grab end fitting of the invention.

FIGS. 8*a*, 8*b* and 8*c* show an embodiment of a chain-grab end fitting (10) which would be suitable for use with the method of the invention. The end fitting body (80) fits within the end of the buttress stand, and is held in place by a pin (81) which runs through holes in the body (80) and stand.

Provision of a number of holes permits a range of length adjustment of the buttress stand. A keeper (82) prevents the pin (81) from pulling out inadvertently. A grab plate (84) is attached to the body (80), and has a slot (83) into which a link of chain (87) can fit. Since the slot (83) is only the width of the link of chain, the next link will wedge against the plate (84) and hold the chain in place. In the variation shown in FIGS. 8*a* and 8*b*, a stopper pin (85) is slipped into loops (88) and secured with keeper (86), to keep the chain (87) from slipping out of the slot (83). FIG. 8*c* shows a simpler variation which omits the pin (85) and loops (88).

Figure 9:
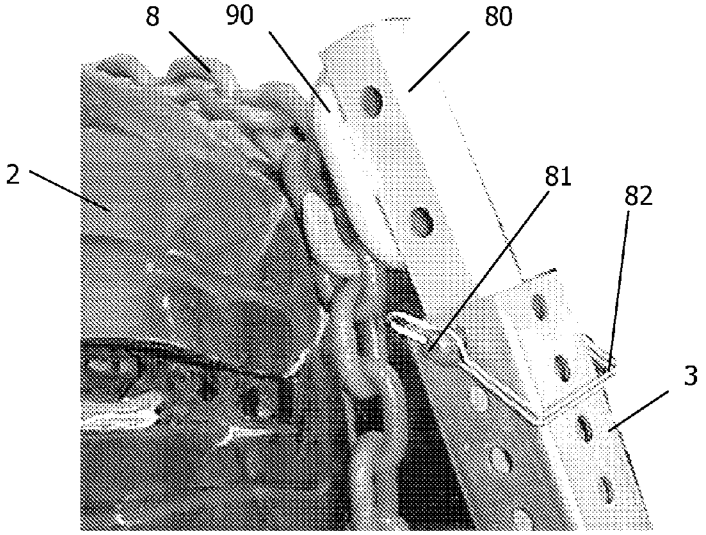
FIG. 9 shows still another embodiment of the chain-grab end fitting of the invention, in use on a stabilized vehicle.

FIG. 9 shows another embodiment of the chain-grab end fitting, in use engaging a chain (8) against a vehicle fender (2). Like the other embodiments shown in FIGS. 8*a*-8*c*, it has a body (80) secured to the buttress stand (3) by pin (81), held in by keeper (82). In this embodiment, the chain (8) is held by a split chain link (90) welded to the body (80). The chain (8) is hooked by the split link (90) and thereby secured against the tension.

Figure 13:
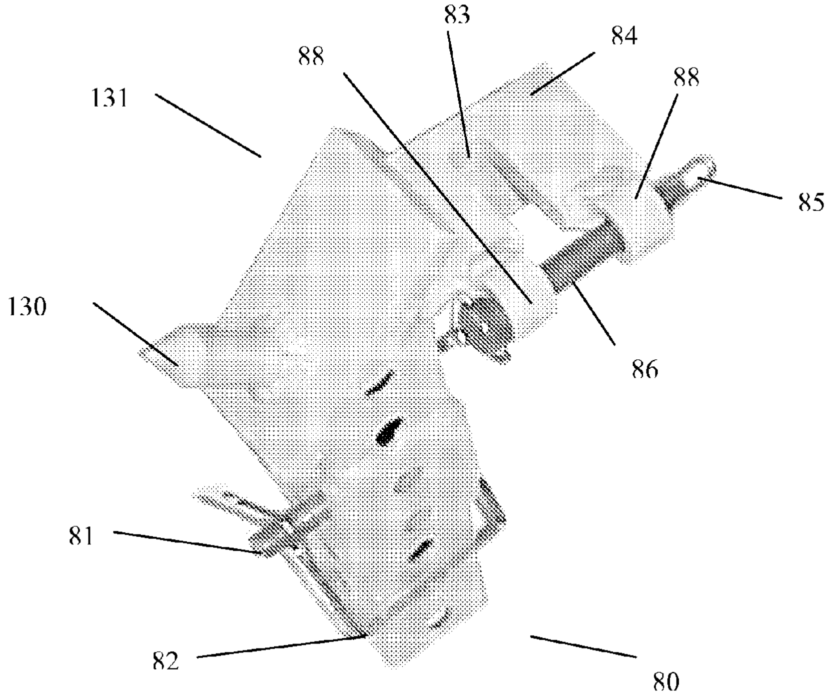
FIG. 13 shows another embodiment of the chain-grab end fitting of the invention, combined with another type fitting.

FIG. 13 shows yet another embodiment of the chain-grab end fitting, combined with another type fitting having a round-point fitting (130) on an angled plate (131). The round-point fitting can be inserted into factory knockouts in vehicle frames, bolt holes, or other openings when the stand is used in other applications. The round-point fitting could also be a channel, chisel point, angle, etc.—whatever other function might be desired to be combined with the chain-grab end fitting. The other elements of the chain-grab end fitting are as discussed above.

(62) run chain (8) from one end fitting to the other under the end (hood or trunk lid (11), or pickup truck bed (110) of the vehicle (1) from one stand (3) to the other with slack extending up to undercarriage (7) on each side. If necessary, as shown in FIG. 12 with a hatchback vehicle (125), it may be necessary to break out the side windows (121) and run the chain (8) through the cargo area. The same would be true of sports-utility vehicles (SUVs), station wagons, vans or other similar vehicles which have a roof extending to or the rear of the vehicle and no horizontal rear deck or trunk.

It will be recognized by one skilled in the art that most modern vehicles lack classic fenders as that term traditionally is defined, however, the terms "fender" and "fender area" are used herein to describe generally a side body panel of a vehicle, which typically is located near the wheels and may include, for example, fenders, wheel wells, cutouts, as well as other similar structures.

Note that in the context of the invention the term "chain" is meant to encompass literal chains, as well as straps, ropes, cables, slings, wires, etc.—the terms are used interchangeably to refer to a flexible or semi-flexible tie member which may be attached to two or more points;

(63) tighten slack and pull end fittings (10) to fender (2) using a ratchet strap (9) from one end of chain (8) to other end of chain at undercarriage (7).

Note that the term "ratchet strap" is meant to include any adjustable-length flexible member, such as straps with ratchet adjusters, as well as locking straps, "come-alongs", turnbuckle straps or chains, or other similar arrangements. The length of the flexible member may be adjusted between said points to cause a change in the tension in that member by means of a cam-buckle, ratchet, binder, turnbuckle, come-along, or similar device for tightening.

(64) restrain chain (8) from sliding off end of vehicle by attaching a ratchet strap (4) to chain (8) near the trunk lid (11) or other horizontal surface such as a pickup truck (111) cap or bed (110) in FIG. 11, (or the hood, if the front end of the vehicle is being stabilized) and running up to undercarriage (7) in front of wheel assembly (swing-arm pivot point may be suitable);

With a typical sedan it is preferred to place the stands and straps/chains on both sides to be sure the chain can not slip over the rear of the vehicle at any location. However, with an SUV, hatchback, or wagon type vehicle you have a roof post at the very back of the vehicle. If you break the windows and pass through here with the chain there may be no need to use the above referenced tie members on either side unless vehicle condition requires it. I recommend it always be done on both sides as a practice such that it becomes a standard procedure that will not be left out when needed, however, technically it can be done on both sides or one side only.

(65) restrain bases from sliding in all directions by any means or combination thereof. For example, attach a ratchet strap (6) to bases of buttress stands (3) and tighten, or alternatively, for example, stake each base to the ground; and (66) if needed, place wedges (13) or similar in front of each roof support post at the opposite end of the vehicle ("A" pillar (12) or hood or front of roof, if the rear is raised, or rearmost pillar, if the front is raised).

In practice, execution of the above steps takes only about two minutes to accomplish. There is little thinking required in terms of deciding how to set the stands, how to gain purchase with the vehicle, or how to keep stabilization from interference with patient access/extrication.

If a third stand is desired at the rear center of the vehicle, it optionally can be added at any time, as shown in FIG. 10, where a jack-type stand (100) is used to support the bumper (101) of car (102). In this case, straps (103) may be attached from the third stand (100) to the bases (105) of the fender stands (3).

Also note in FIG. 10 the additional straps (104) running from the bases (105) of fender stands (3) to the opposite (front) end of the car (102). This configuration would keep the passenger compartment free from strap attachment.

A situation could arise where one side of the vehicle is otherwise supported either because obstructions demand a different support on that side or the way the vehicle came to rest provided that support. The chain could still be wrapped around in the same fashion, and a stand applied at only one side. The base of this stand could be attached to an object on the opposite side of the vehicle. Alternately, if the stand were a jack stand which is capable of self tightening, the base of the stand could be "picketed" or staked in place or otherwise prohibited from movement by a strap or other means.

Figure 7:
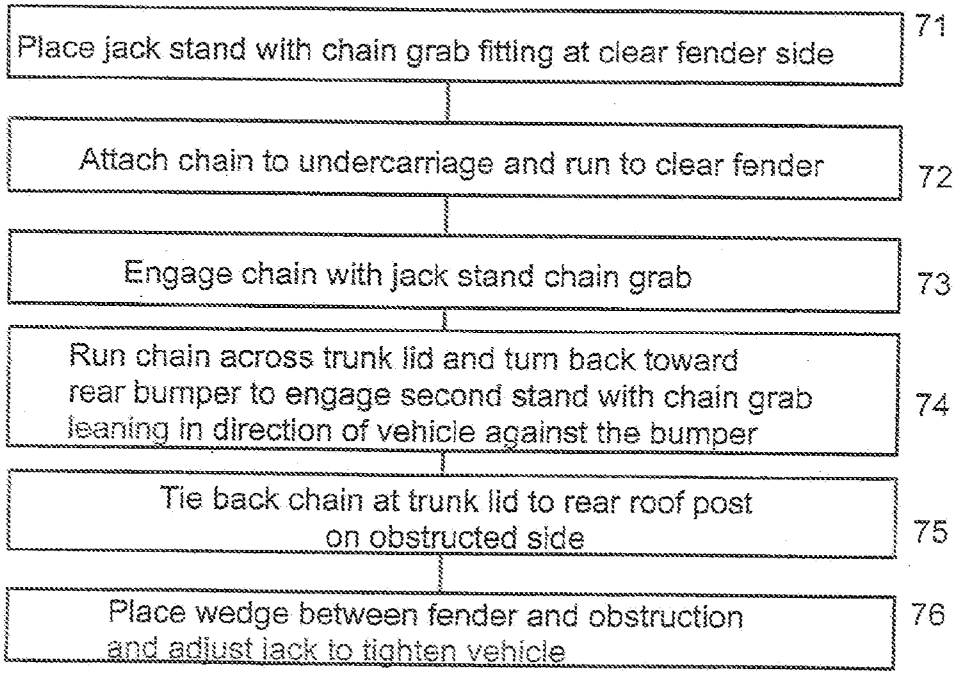
FIG. 7 shows a flowchart of an alternative method of the invention.
Figure 14:
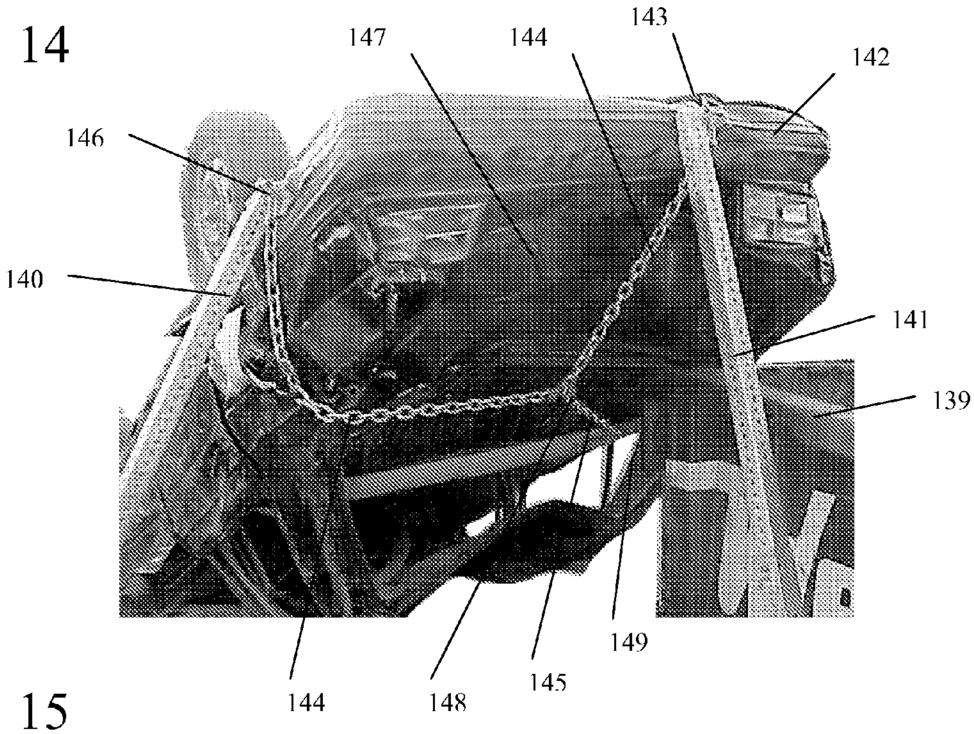
FIG. 14 shows a variation on the method of the invention, using a tensioned and restrained chain.

There are other possibilities—wherever one can place a tight chain, one can place a stand with a chain grab end fitting. Let's assume a car is resting on its roof beside an obstruction (say, a building or other object such as the dumpster (139) shown in FIG. 14) which would prevent placing a stand at one of the fenders. The other fender is clear. The bumper stand (141) offers vertical support. It may be a jack stand staked to the ground and adjusted to tighten, or an adjustable stand with ratchet strap for tightening. Here's how it would be set up (referring to the flowchart of FIG. 7, and the view of FIG. 14):

(71) place a jack stand with chain grab fitting (140) at clear fender side.

(72) attach chain (144) to undercarriage and run towards clear fender.

(73) engage chain with jack stand (140) chain grab (146).

(74) run chain (144) across trunk lid (147) and turn back towards rear bumper (142) to engage second stand (141) with chain grab (143) leaning in direction of vehicle against the bumper (142).

(75) tie the center of the chain back to the rear roof post (149) on the obstructed side with a second chain or strap (145), creating a corner (148) in the chain (144) on the trunk lid (147).

(76) place a wedge between car fender and obstruction and adjust jack of step (71) to tighten vehicle against obstruction.

Figure 15:
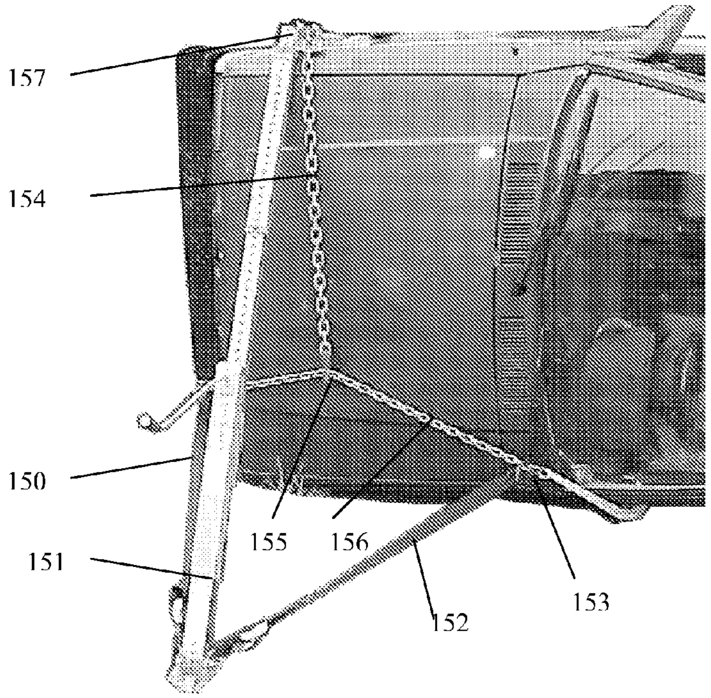
FIG. 15 shows a variation on the method of the invention, with a single stand on one side of the vehicle.

Alternately, if the obstruction does not prevent a full wrap of the chain around the tail end (or front end), the chain could be placed and a loop possibly taken off of it. FIG. 15 shows a car supported in this fashion, which is another application of a restrained and tensioned chain. The "chain" here refers to the chain (156) we wrap around the tail end of a vehicle and restrain in our preferred technique described in FIG. 6. This chain would serve as a foundation to build off of. For example, another chain (154) could be attached to this restrained chain (156) with hook (155). The new chain (154) could come up and attach to the stand (151) at the chain grab end fitting (157). Note that the chains (154)(156) serve as purchase for not only the end fitting (157) but also the straps (150)(152)—the latter attaching to chain (156) at hook (153).

Figure 16:
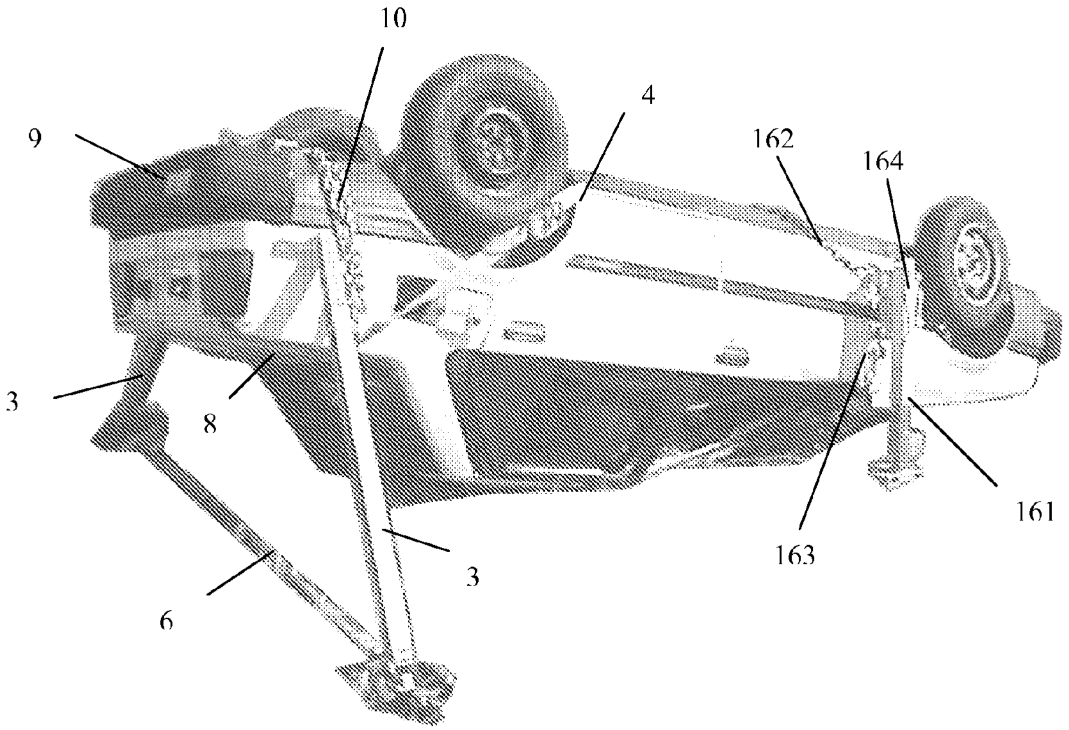
FIG. 16 shows a vehicle stabilized by the method of the invention, with a jack used to lift the vehicle to free an occupant.

FIG. 16 shows a jack (161) to be used along with a chain grab fitting (164) and chain (162)(163) to perform low level lifts of objects. In this configuration, the device may be useful in lifting a roof-resting car off the ground to free a patient trapped beneath, in lieu of setting up air lift bags.

Additional Alternative Embodiments

Our research in the area of buttress stabilization of a roof-resting vehicle has led to improvements as well as alternative methods, which in many cases simplify and quicken the stabilization process. We have discovered through such research that, while the foregoing methods are a great improvement over any prior means, there are improved derivatives of the technique which are equally valuable in saving time and producing a stable working environment.

Sway Straps

Figure 17:
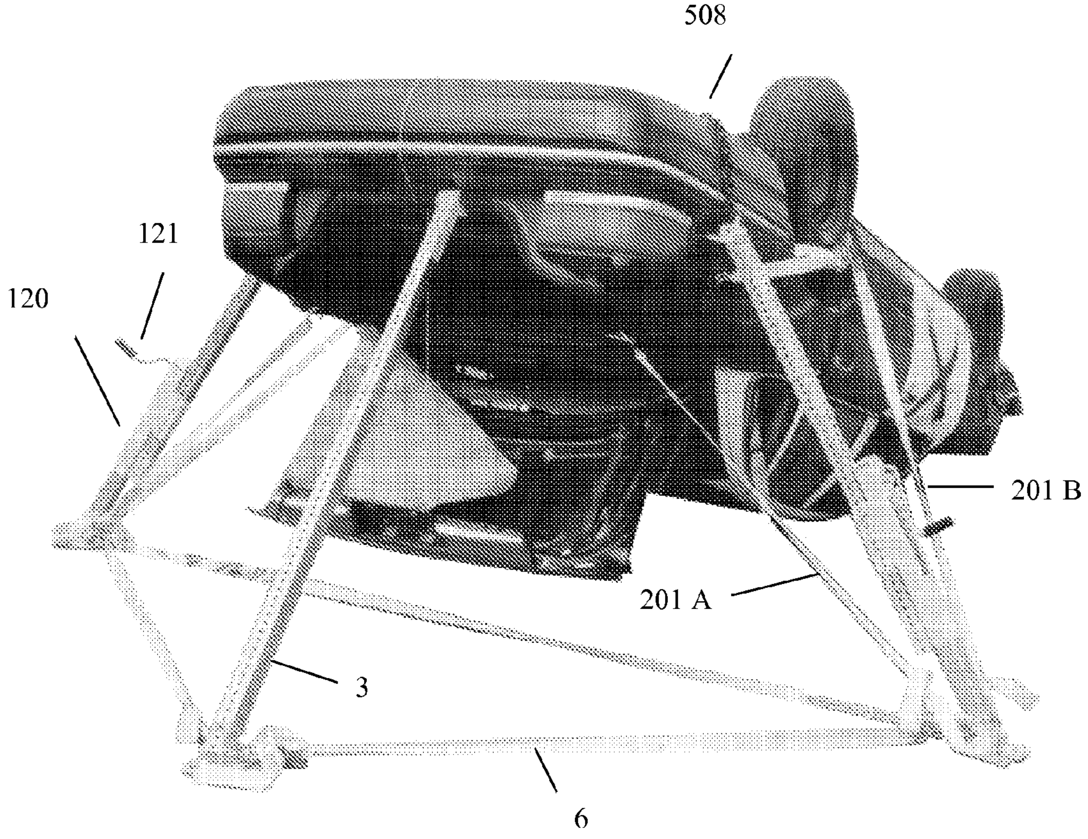
FIG. 17 shows a variation on the method of the invention, using the additional step of adding sway straps.

Referring now to FIG. 17, one improvement is the addition of two more flexible members (201) attached from the base of the stand up to the chain saddle. The need for these two members arises when lifting of the vehicle is involved. When the vehicle is left unelevated from its roof-resting positions, typically the standard method provides adequate stability. However, once the vehicle is elevated the vehicle may be less stable due to the fact that the shape created by the two stands the vehicle and the base to base strap is a trapezoid. Such a shape is inherently unstable. This allows for the ability of the vehicle to sway with the potential for it to cause further complications. Adding the extra strap at each base from the base up to the chain at the fender/trunk corner in effect creates a triangle at each side of the vehicle, thus eliminating or at least decreasing the amount of freedom the vehicle has to sway.

Staking The Hood

Figure 18:
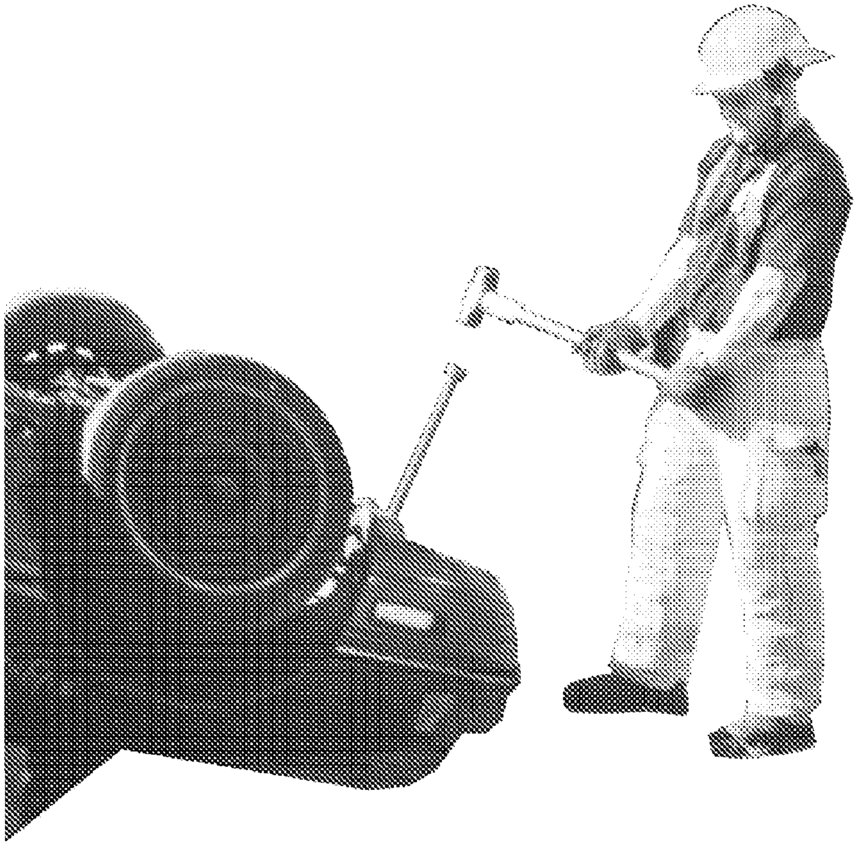
FIG. 18 shows a variation on the method of the invention, using the additional step of staking the hood.

Referring now to FIG. 18, another unique concept in the area of roof-resting vehicle stabilization is the method of "staking" the hood of the vehicle to the ground to prevent front to back movement of the vehicle. This new technique decreases the amount of equipment required and greatly speeds up the process. The method involves placing a stake through the engine compartment and driving the stake through the vehicle hood area into the ground.

Alternatives to Chain Saddle

We have developed several alternate methods of creating a chain or similar flexible member type purchase with a roof resting vehicle for the purpose of buttress stabilization. These include the Rear Post Chain Wrap method, J-Hooking the Rear Post, J-Hooking the Side-Wall, and J-Hooking the Rear Deck, each of which is described below in detail.

While the figures and description herein show attachment of the chain to the rear post for the purpose of illustration of the methods, the invention contemplates alternatively attachments to other posts, such as a front or middle post.

Rear Post Chain Wrap

Figure 19:
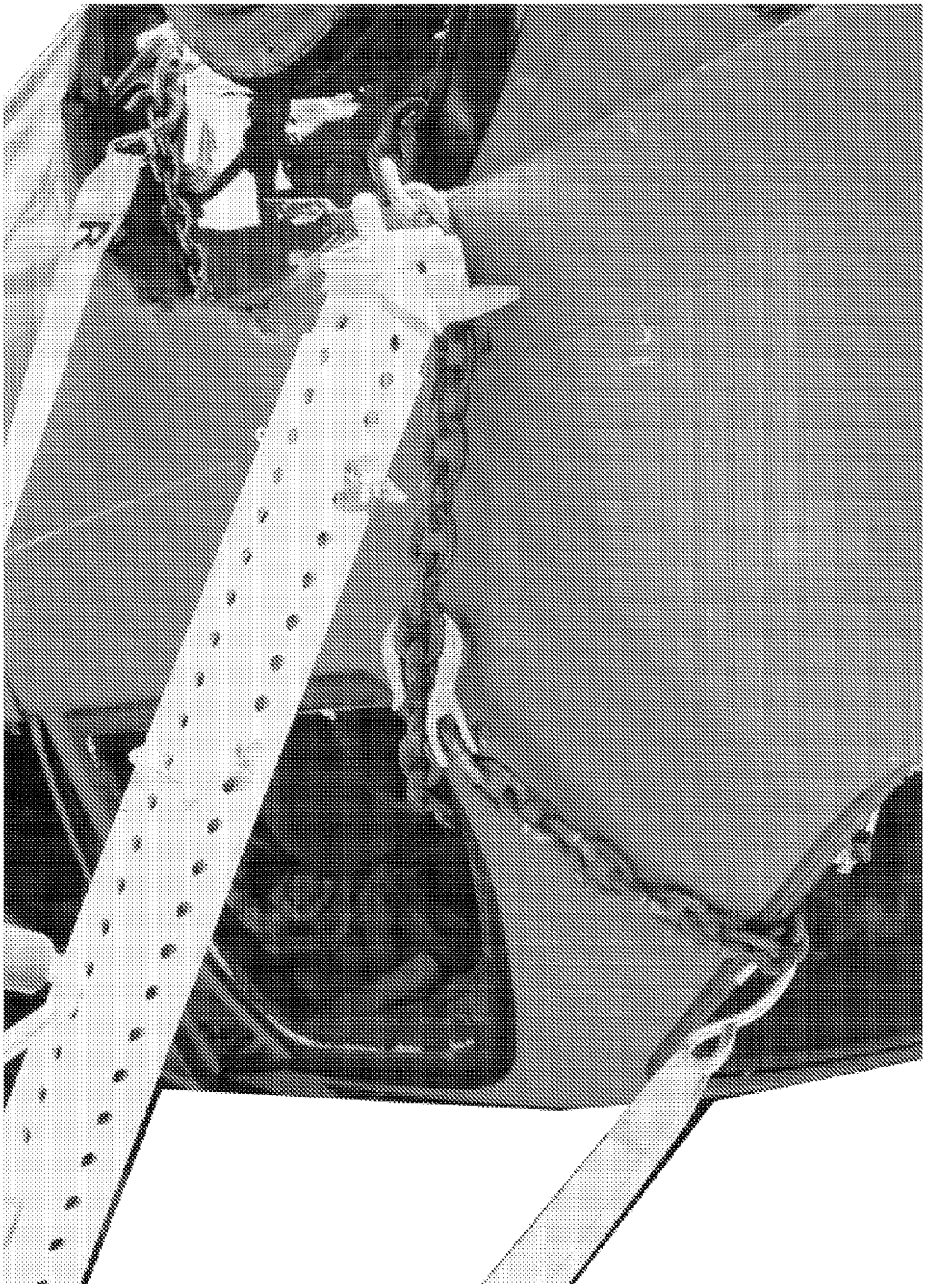
FIG. 19 shows a variation on the method of the invention, using the rear post chain wrap method.

Referring now to FIG. 19, one alternative method is to wrap a chain (202) around a roof post, preferably the rear-most post (203) like a noose and bringing one end of the chain up the side of the vehicle where it may be engaged by a chain grab type fitting (204) affixed to the buttress stands. This method, in most cases, eliminates the need to secure the chain from slipping off the vehicle. This method also eliminates the need for a chain saddle to pass across the trunk lid of a sedan type vehicle, thus allowing trunk access. This method also eliminates the need for a chain saddle to pass across the rear window of a hatchback, which is often a critical patient access point. This method also involves far fewer components than the standard method. It preferably involves the two buttress stands with chain grab type end fittings, the base to base restraint chain or strap, as well as a chain wrap at each post which can be accomplished using a single chain. If lifting or additional stability is desired, one may incorporate the two optional sway prevention straps (201).

J-Hooking The Rear Post

Figure 20:
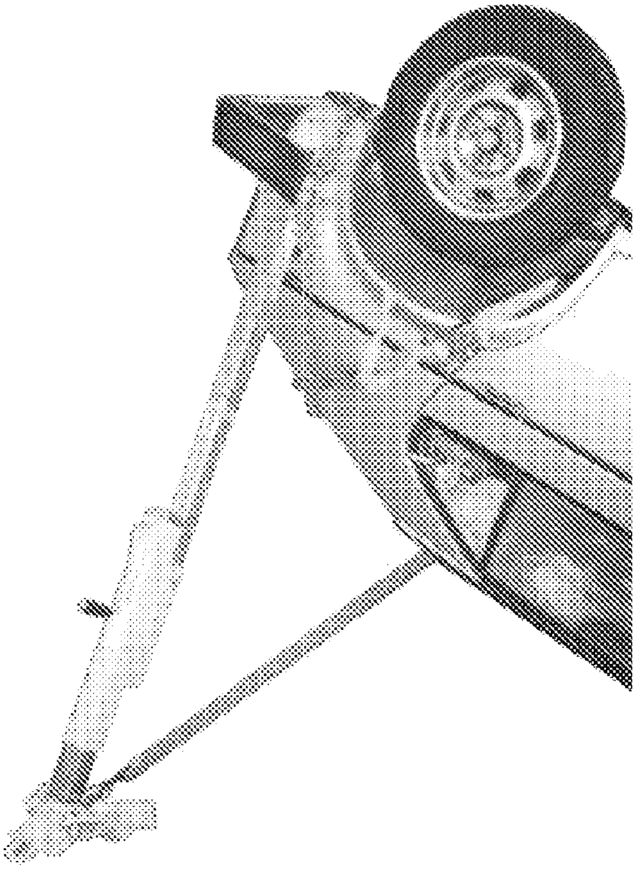
FIG. 20 shows a variation on the method of the invention, using the method of J-hooking the rear post.

Referring now to FIG. 20, another alternative method is enter through the rear window (205) of an inverted vehicle and attach a large J-hook (206) to the post. Alternatively, one can pass through a side window and attach to any post. A chain (207) is then attached (if not a chain/J-hook assembly) to the J-hook and brought up the side of the vehicle where it may be engaged by a chain grab type fitting (204) affixed to the buttress stands. This method, in most cases, eliminates the need to secure the chain from slipping off the vehicle. This method also eliminates the need for a chain saddle to pass across the trunk lid of a sedan type vehicle, thus allowing trunk access. This method also eliminates the need for a chain saddle to pass across the rear window of a hatchback, which is often a critical patient access point. This method also involves fewer components than the standard method. It preferably involves the two buttress stands with chain grab type end fittings, the base to base restraint chain or strap, as well as a J-hook/chain attachment at each post. If lifting or additional stability is desired, one may incorporate the two optional sway prevention straps (201).

J-Hooking The Sidewall

Figure 21:
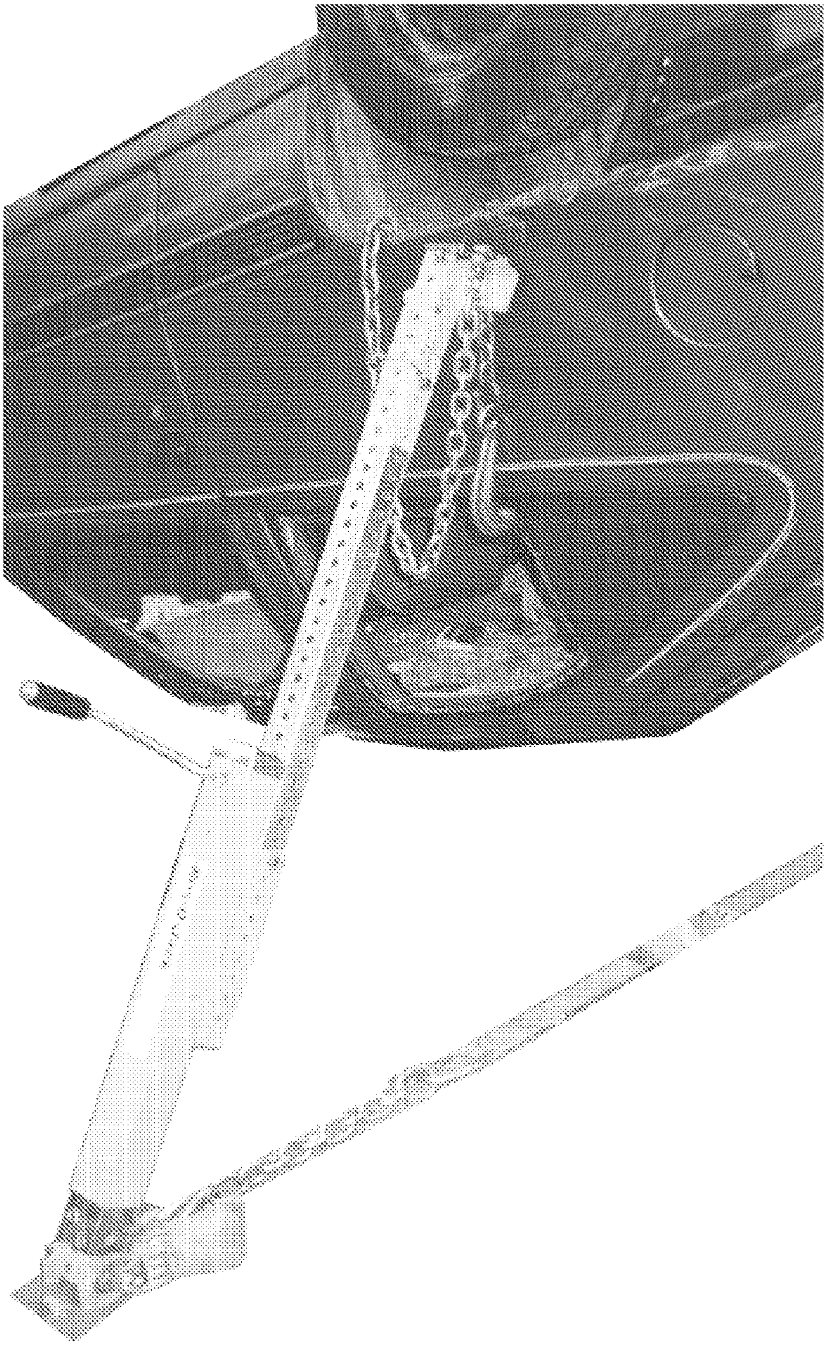
FIG. 21 shows a variation on the method of the invention, using the method of J-hooking the sidewall.

Referring now to FIG. 21, another alternative method is enter through the side window (208) of an inverted vehicle and attach a large J-hook (206) to the sidewall (209). A chain (207) is then attached (if not a chain/J-hook assembly) to the J-hook and brought up the side of the vehicle where it may be engaged by a chain grab type fitting (204) affixed to the buttress stands. This method, in most cases, eliminates the need to secure the chain from slipping off the vehicle. This method also eliminates the need for a chain saddle to pass through the passenger compartment of an SUV, minivan, or wagon vehicle. This method also eliminates the need for a chain saddle to pass across the trunk lid of a sedan type vehicle, allowing trunk access. This method also eliminates the need for a chain saddle to pass across the rear window of a hatchback, which is often a critical patient access point. This method also involves fewer components than the standard method. It preferably involves the two buttress stands with chain grab type end fittings, the base to base restraint chain or strap, as well as a J-hook/chain attachment at each post. If lifting or additional stability is desired, one may incorporate the two optional sway prevention straps (201).

J-Hooking The Rear Deck

Figure 22:
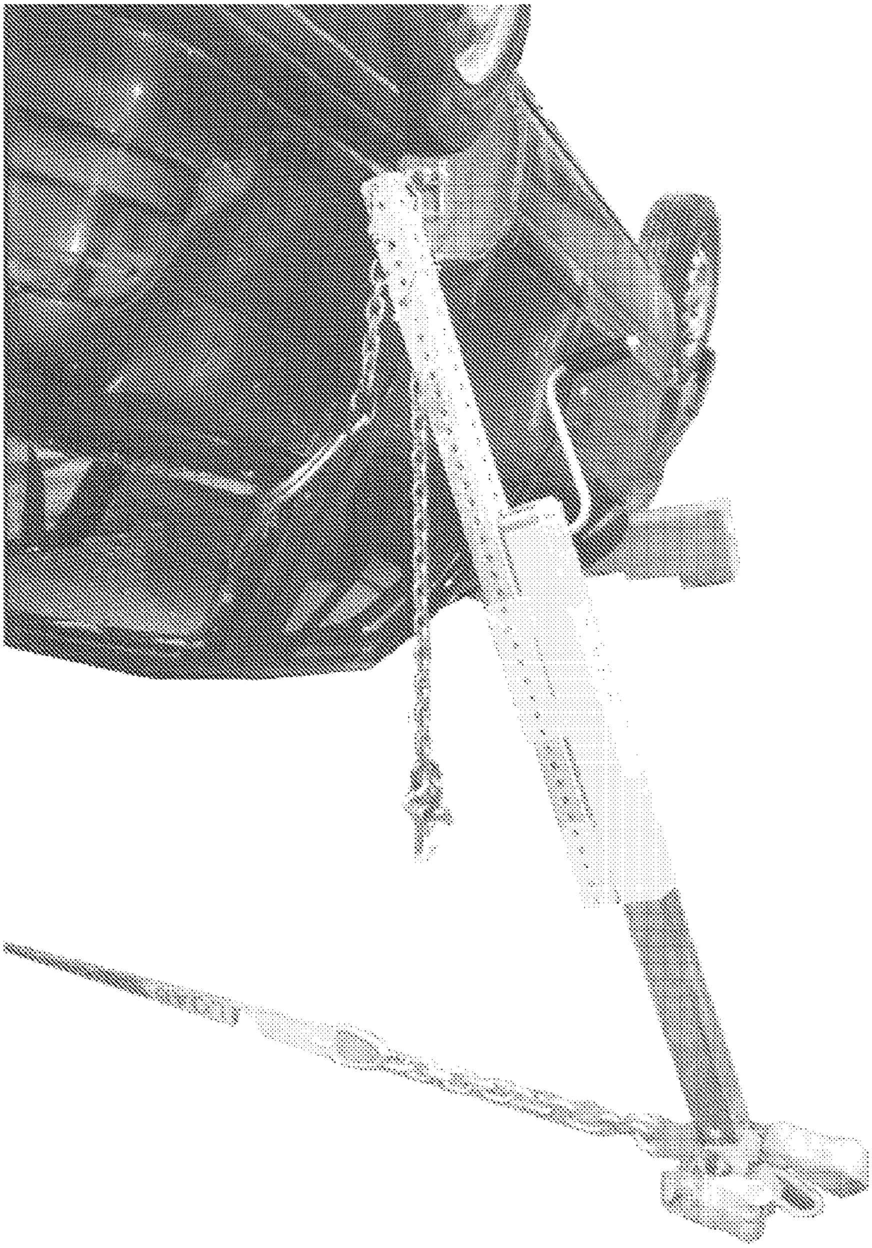
FIG. 22 shows a variation on the method of the invention, using the method of J-hooking the rear deck.

Referring now to FIG. 22, another method is enter through the rear window (205) of an inverted vehicle and attach a large J-hook (206) to the rear deck (210) or speaker deck. A chain (207) is then attached (if not a chain/J-hook assembly) to the J-hook and brought up the side of the vehicle where it may be engaged by a chain grab type fitting (204) affixed to the buttress stands. This method, in most cases, eliminates the need to secure the chain from slipping off the vehicle. This method also eliminates the need for a chain saddle to pass through the passenger compartment of an SUV, minivan or wagon vehicle. This method also eliminates the need for a chain saddle to pass across the trunk lid of a sedan type vehicle, allowing trunk access. This method also eliminates the need for a chain saddle to pass across the rear window of a hatchback, which is often a critical patient access point. This method also involves fewer components than the standard method. It preferably involves the two buttress stands with chain grab type end fittings, the base to base restraint chain or strap, as well as a J-hook/chain attachment at each post. If lifting or additional stability is desired, one may incorporate the two optional sway prevention straps (201).

Hole Saw Method For Creating A Purchase Point

Prior art techniques for making a purchase with a vehicle using round pin type or round point end fitting typically involve the use of pre-existing holes or the violent action of piercing a hole. Pre-existing holes in a vehicle provided by the manufacturer are not always readily available or in the needed location. The act of piercing a hole with a tool, such as a Halligan tool, for example, is a violent and loud action, which has the potential to further complicate the accident scene. A pierced hole may also have a tendency to tear under load.

Figure 23A:
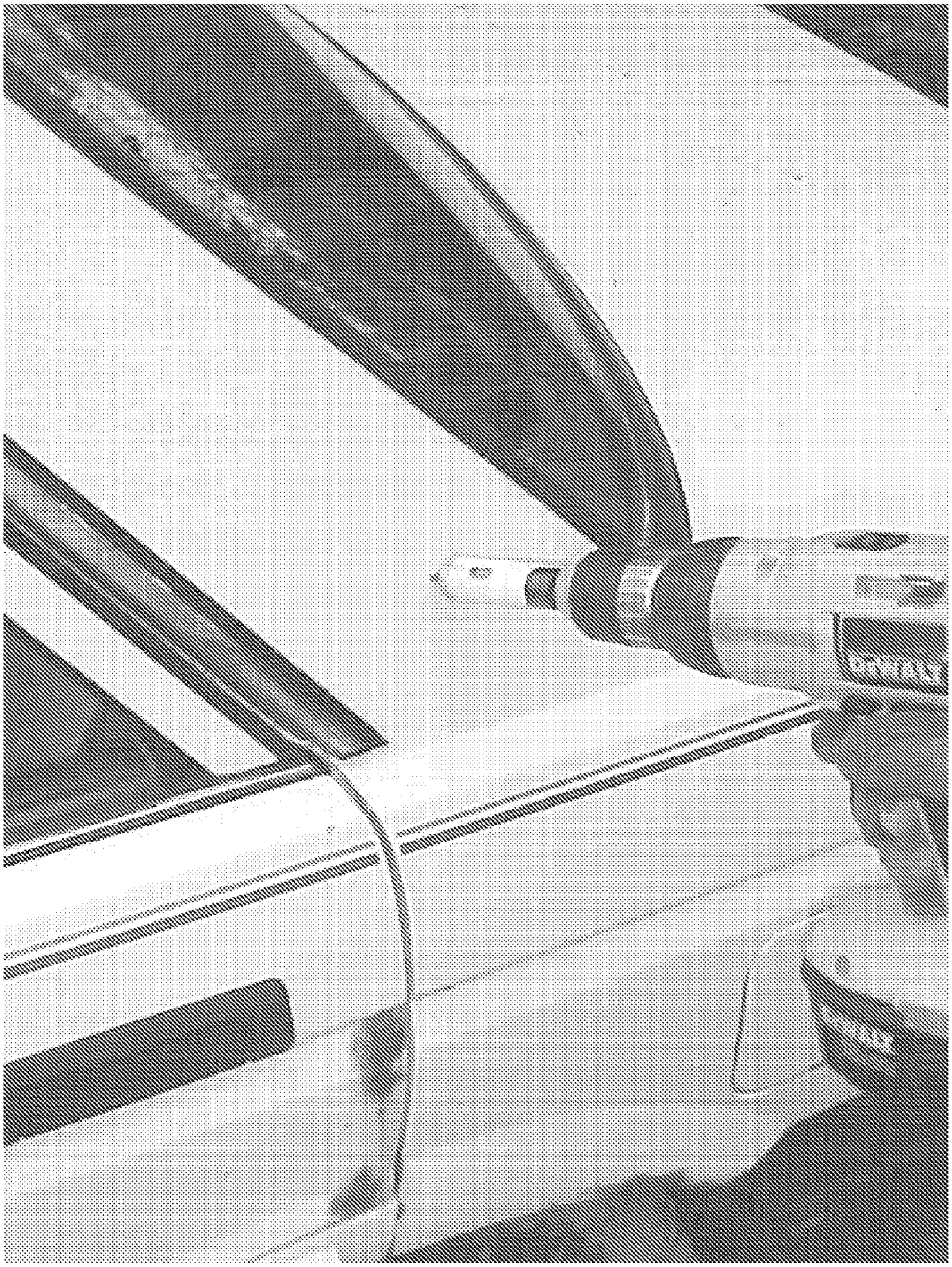
FIGS. 23A-23C shows a variation on the method of the invention, using the hole saw method for creating a purchase point.
Figure 23B:
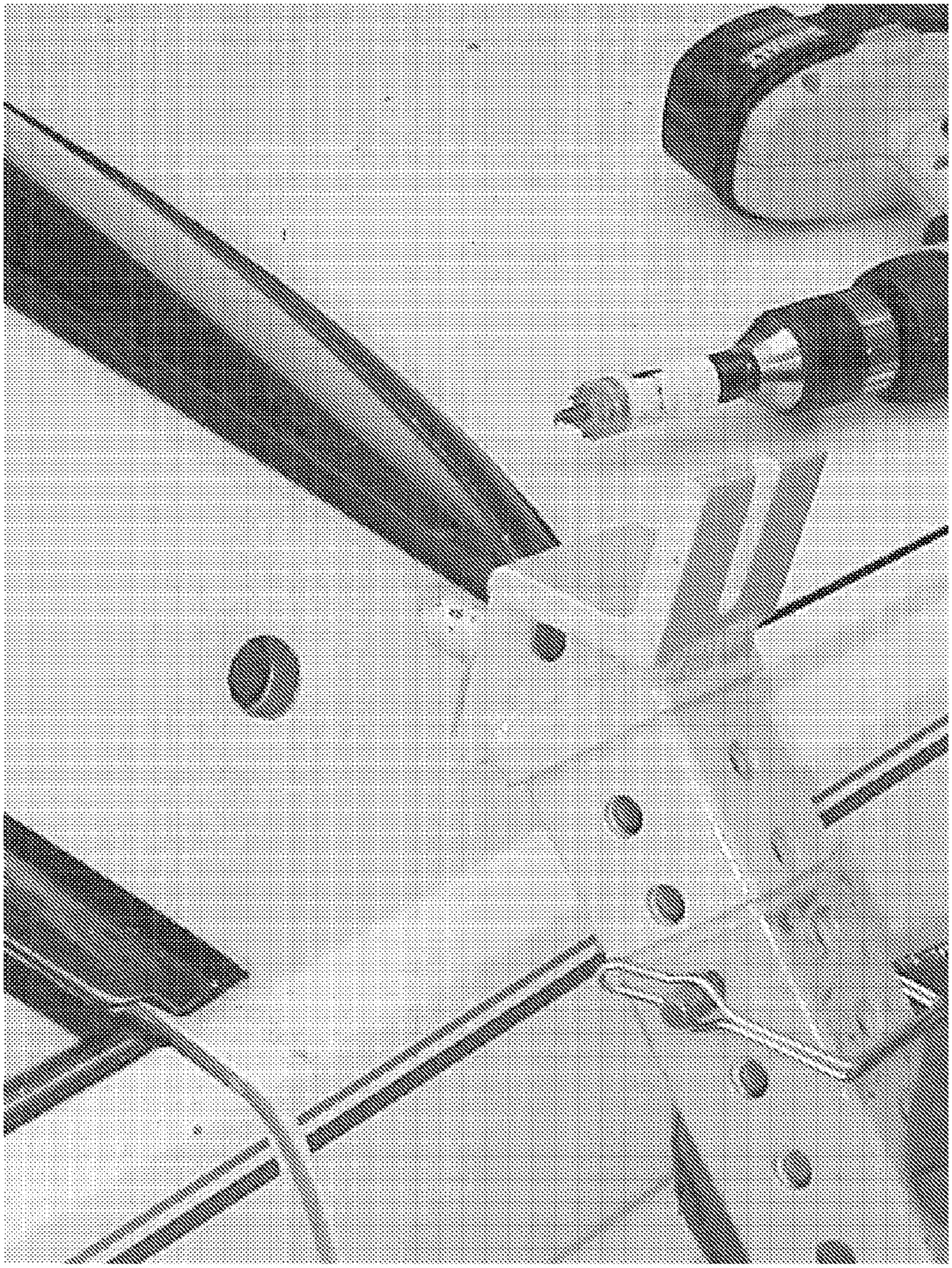
Figure 23C:
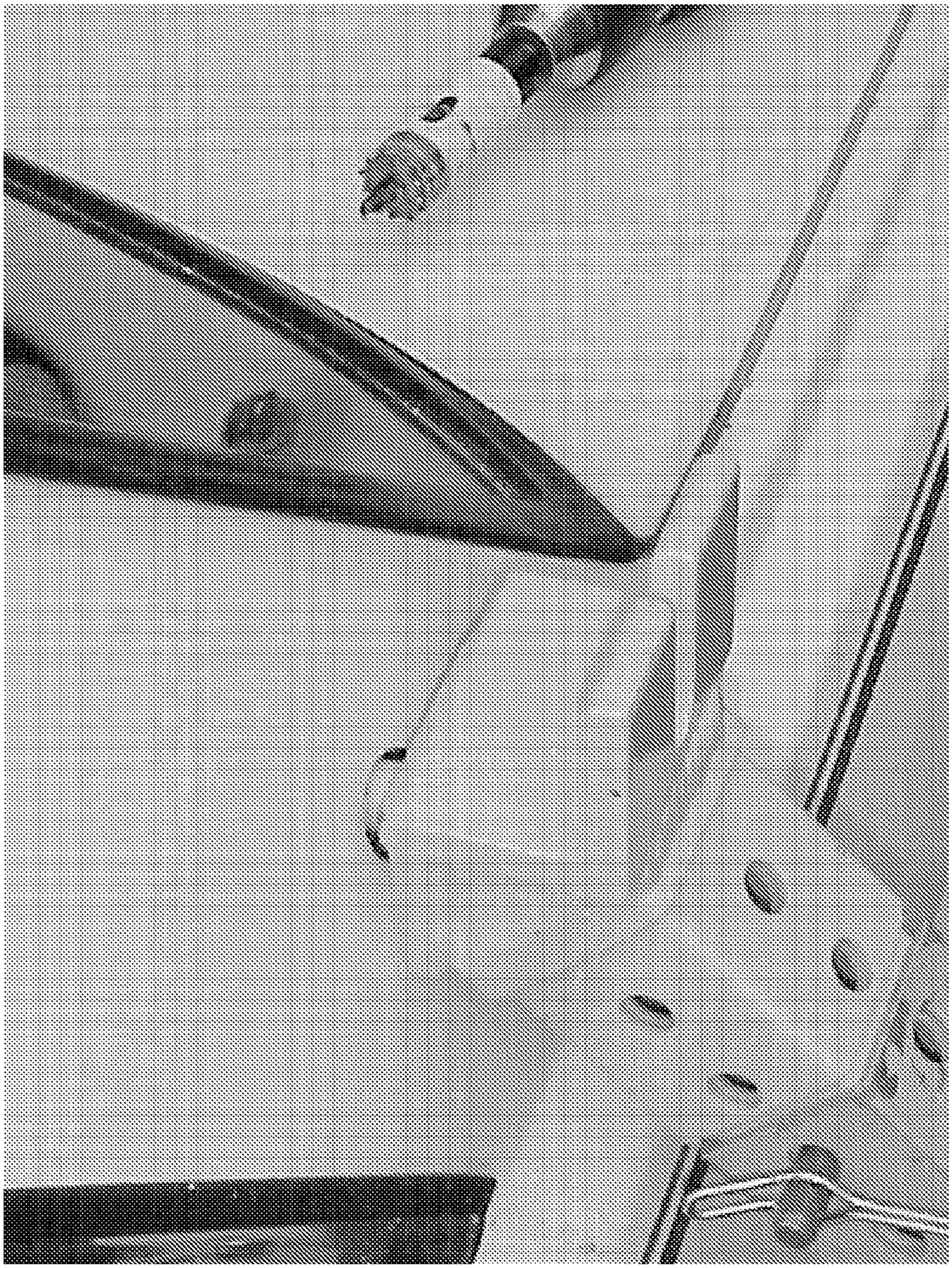

Referring now to FIG. 23, a new method for creating a purchase point where needed in a non-violent fashion and without tearing involves the use of a drill operated hole saw. The hole saw quickly creates a smooth purchase point for a round point end fitting. The method includes the steps of creating purchase holes (220) using a drill-operated hole saw in the desired location. A buttress stand with a round point end fitting (221) is then leaned against the vehicle, with the round point inserted into the hole created by the hole saw. The base of the buttress stand is then attached to the vehicle or alternatively to the opposite buttress stand.

Multi-function Buttress Stabilization Stand End Fitting

Figure 24:
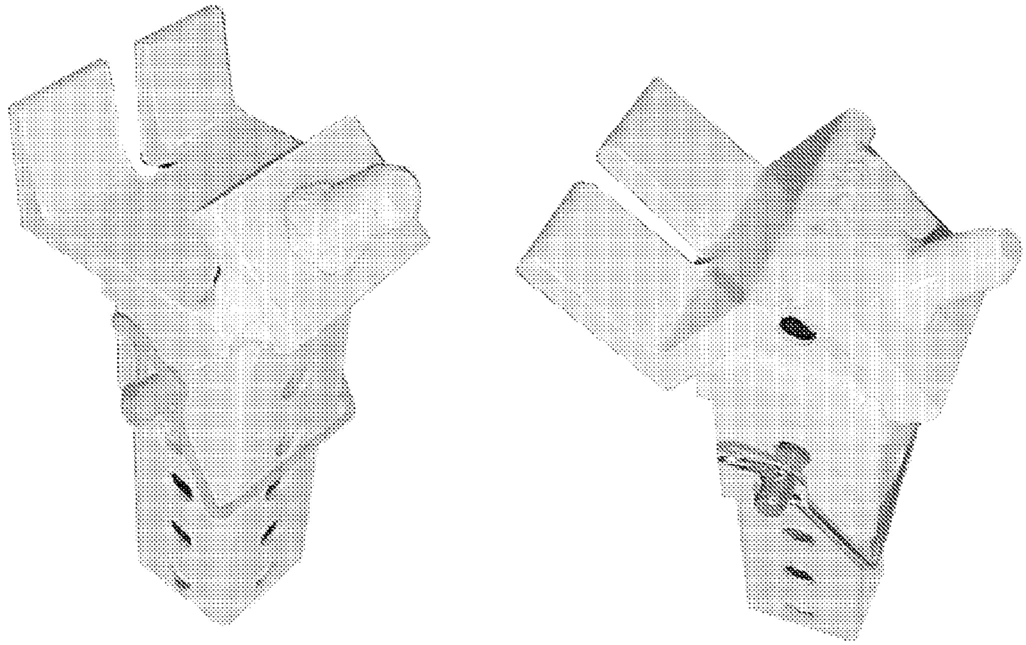
FIG. 24 shows a multi-use buttress stand end fitting suitable for use with the method of the invention.

FIG. 24 shows a new multi-use buttress stand end fitting incorporating multiple components to maximize versatility. It is desirable to maximize the number of characteristics within a single fitting to avoid the necessity of switching components. The end fitting preferably incorporates a round point (222) for engaging holes, an angle bracket (223) for cradling corners or objects, a protruding lip (224) to engage a recess, and a slot (225) to grip a chain. Optional features include being rotatable, having a lock pin for chain engagement, and means for use with extendible stands or fixed length stands, such as timbers.

Adjustable Turret Head

Figure 25:
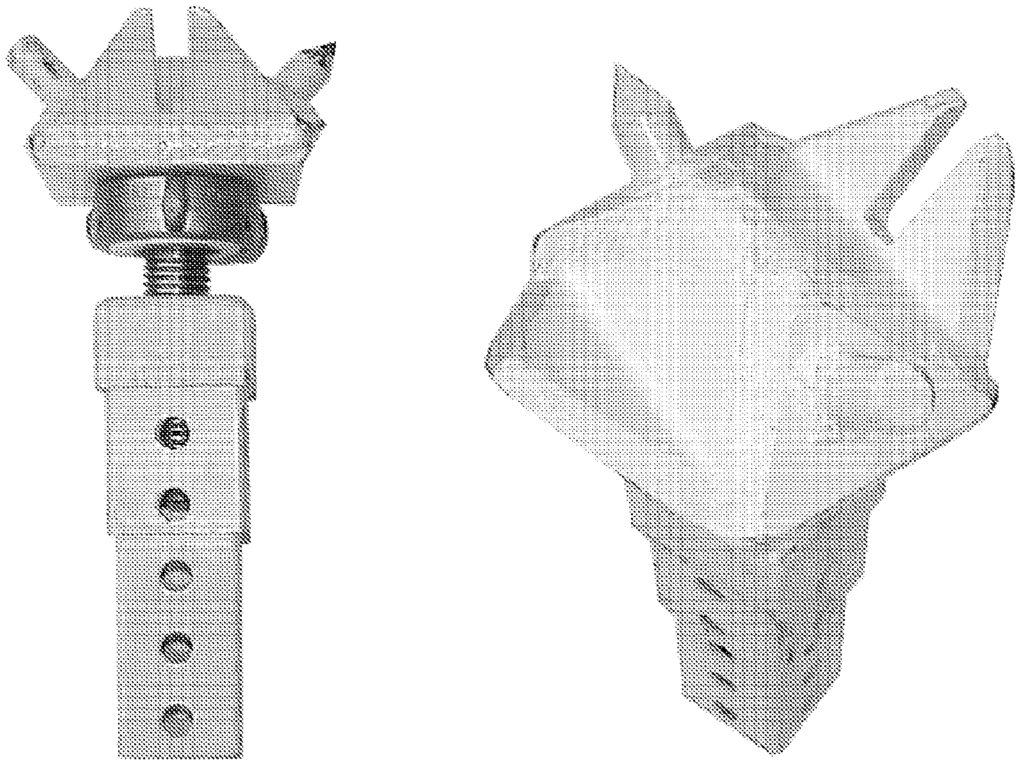
FIG. 25 shows two views of a turret head buttress stand end fitting suitable for use with the method of the invention.

FIG. 25 shows a new turret head buttress stand end fitting. The head (226) raises and lowers by turning the ribbed collar (227) fixed to the threaded jack shaft (228). It has a ribbed or similar means (229) for gripping for use with a spanner wrench or similar means. The top of the head is free to rotate independently of rotation of the jack shaft. The base of the head preferably has a stepped design to allow for insertion in multiple size components. It also optionally includes one or more engagement means, such as a chain slot for chain engagement with or without a locking means, a blunt round pin for engaging holes, a pointed round pin for piercing holes, an angle for cradling corners, a lip for engaging a linear protrusion, a pointed flat protrusion for additional piercing applications. It is designed to work with different stand types and/or wood timbers.

Buttress Stabilization Base With Multiple Restraint Means

Figure 26:
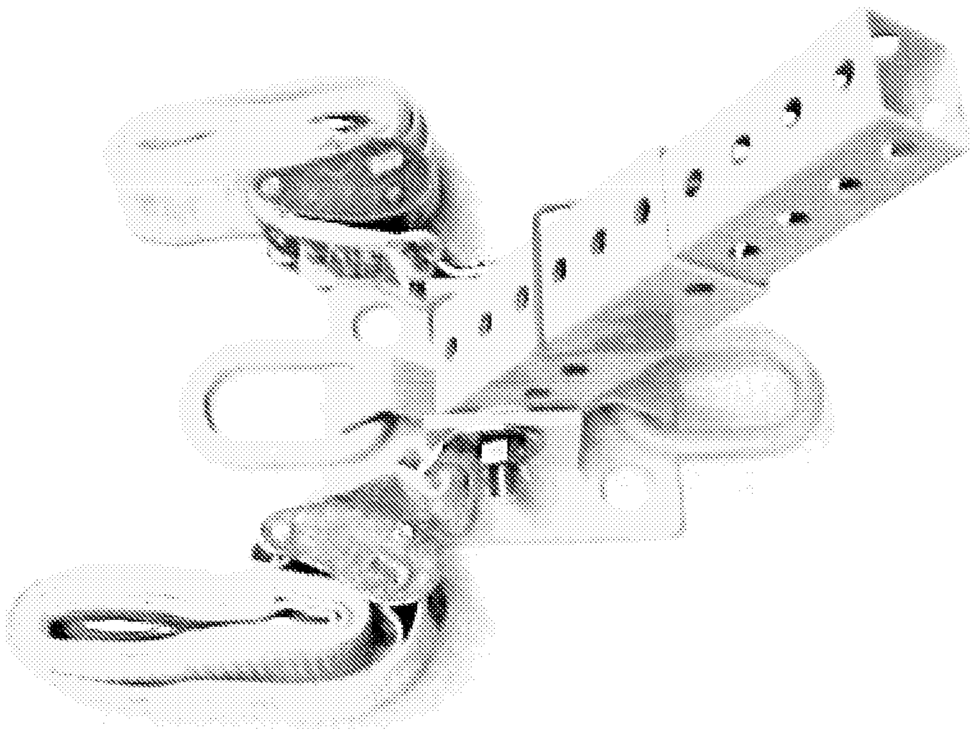
FIG. 26 shows a pivotal buttress stabilization base plate suitable for use with the method of the invention.

FIG. 26 shows a pivotal buttress stabilization base plate with multiple components/characteristics to maximize versatility. It is desirable to maximize the number of characteristics within the base plate to accommodate multiple restraint types. The base plate preferably incorporates round holes (230) for engaging stakes, pre-attached cam buckle straps, ratchet straps, chain, or other flexible members, and an attached link (231) for connecting straps, chains, cables, hooks, or similar restraining flexible members. The link optionally accommodates a large stake. Other optional features include being rotatable, having an upright post and an anti-skid bottom surface.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A buttress stand end fitting, comprising:

a first tubular member having an upper end and a lower end, the lower end being adapted for concentric engagement with a first end of a second tubular member having connected to a second end thereof a substantially planar base plate engaged with the ground, the upper end of the first tubular member being adapted for engagement with the buttressed structure, and further comprising a multi-faced head that includes two opposing working faces that are adjustable by rotating said end fitting to expose the desired working face, wherein said first opposing working face comprises a rigid inclined plate having affixed thereto a rod or cylinder for engaging holes, and wherein said second working face comprises an angle or channel bracket having a vertically oriented slot to grip a chain.

2. An adjustable turret head buttress stand end fitting, comprising:

a first tubular member having an upper end and a lower end, the lower end being adapted for concentric engagement with a first end of a second tubular member having connected to a second end thereof a substantially planar base plate engaged with the ground, the upper end of the first tubular member having a rotatable head adapted for engagement with the buttressed structure, the rotatable head further comprising a multi-faced surface that includes at least one member selected from the group consisting of a rod or cylinder for engaging holes, an angle or channel bracket for cradling corners of the structure to be supported, a protruding lip to engage a recess, and a slot to grip a chain, wherein the rotatable head further comprises means for raising and lowering the rotatable head by turning a collar fixed to a threaded jack shaft, wherein the top of the head rotates independently of rotation of the jack shaft.

3. The buttress stand end fitting of claim 1, wherein the substantially planar base plate further comprises round holes for engaging stakes, pre-attached cam buckle straps, ratchet straps, chain or cables, and an attached link suitable for connecting straps, chains, cables, or hooks.

4. The buttress stand end fitting of claim 2, wherein the substantially planar base plate further comprises round holes for engaging stakes, pre-attached cam buckle straps, ratchet straps, chain or cables, and an attached link suitable for connecting straps, chains, cables, or hooks.

5. The buttress stand end fitting of claim 1, wherein said slot extends through a vertical portion of said angle or channel bracket, around and through a corner of said angle or channel bracket and partially through a horizontal portion of said angle or channel bracket.

* * * * *